United States Patent

Loeckle et al.

(10) Patent No.: US 7,831,357 B2
(45) Date of Patent: Nov. 9, 2010

(54) APPARATUS FOR TRIGGERING RESTRAINT DEVICES

(75) Inventors: Gerhard Loeckle, Ludwigsburg (DE); Sabine Brandenburger, Stuttgart (DE); Ralf Maier, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1115 days.

(21) Appl. No.: 10/550,084

(22) PCT Filed: Oct. 18, 2003

(86) PCT No.: PCT/DE03/03499

§ 371 (c)(1), (2), (4) Date: Aug. 21, 2006

(87) PCT Pub. No.: WO2004/083003

PCT Pub. Date: Sep. 30, 2004

(65) Prior Publication Data

US 2007/0271016 A1      Nov. 22, 2007

(30) Foreign Application Priority Data

Mar. 19, 2003   (DE) ................................ 103 12 105

(51) Int. Cl.
*B60R 22/00* (2006.01)

(52) U.S. Cl. .......................................... 701/45; 701/48

(58) Field of Classification Search .................. 701/45, 701/48; 340/436
See application file for complete search history.

(56) References Cited

U.S. PATENT DOCUMENTS

| | | | | |
|---|---|---|---|---|
| 5,826,902 A * | 10/1998 | Foo et al. | ..................... | 280/735 |
| 5,899,946 A * | 5/1999 | Iyoda | .......................... | 701/20 |
| 6,052,634 A * | 4/2000 | Pathe et al. | .................... | 701/45 |
| 6,212,456 B1 * | 4/2001 | Stride | .......................... | 701/45 |
| 6,226,578 B1 * | 5/2001 | Willerton et al. | ............... | 701/36 |
| 6,295,495 B1 * | 9/2001 | Morman et al. | ................ | 701/45 |
| 6,370,461 B1 * | 4/2002 | Pierce et al. | ................... | 701/45 |
| 6,390,498 B1 * | 5/2002 | Francis et al. | ............... | 280/735 |
| 6,421,591 B1 * | 7/2002 | Hackenberg | .................. | 701/45 |
| 6,732,566 B2 * | 5/2004 | Roelleke et al. | ............. | 73/12.08 |
| 6,906,622 B2 | 6/2005 | Kleinschmidt et al. | | |
| 7,630,805 B2 * | 12/2009 | Lu et al. | ........................ | 701/45 |
| 2002/0111729 A1 | 8/2002 | Hackenberg | | |
| 2003/0060980 A1 * | 3/2003 | Prakah-Asante et al. | .... | 701/301 |
| 2003/0100983 A1 * | 5/2003 | Bullinger et al. | .............. | 701/45 |

(Continued)

FOREIGN PATENT DOCUMENTS

DE    198 11 865    9/1999

(Continued)

OTHER PUBLICATIONS

Machine translation of DE-19827557 from EPO; 2 pages.*

*Primary Examiner*—Khoi Tran
*Assistant Examiner*—Brian J Broadhead
(74) *Attorney, Agent, or Firm*—Kenyon & Kenyon LLP

(57) ABSTRACT

An apparatus for triggering restraint devices includes crash sensors inside and outside of a control unit. The apparatus checks a crash signal of the crash sensors using a plausibility signal. To check the crash signal, the apparatus receives the plausibility signal from a vehicle sensor outside of the control unit, and then triggers the restraint devices as a function of the crash signal and the first plausibility signal.

6 Claims, 1 Drawing Sheet

U.S. PATENT DOCUMENTS

| | | | |
|---|---|---|---|
| 2003/0139866 A1* | 7/2003 | Frimberger et al. | 701/45 |
| 2004/0039509 A1* | 2/2004 | Breed | 701/45 |
| 2004/0117086 A1* | 6/2004 | Rao et al. | 701/36 |
| 2004/0117091 A1* | 6/2004 | Prakah-Asante et al. | 701/45 |
| 2004/0158376 A1* | 8/2004 | Knueppel et al. | 701/45 |
| 2005/0192731 A1* | 9/2005 | Eisele et al. | 701/45 |
| 2008/0109137 A1* | 5/2008 | Eberle et al. | 701/45 |

FOREIGN PATENT DOCUMENTS

| | | |
|---|---|---|
| DE | 198 27 557 | 12/1999 |
| DE | 199 10 596 | 9/2000 |
| DE | 101 38 764 | 10/2002 |
| WO | WO 02/098708 | 12/2002 |

\* cited by examiner

APPARATUS FOR TRIGGERING RESTRAINT DEVICES

FIELD OF THE INVENTION

The present invention relates to an apparatus for triggering restraint devices.

BACKGROUND INFORMATION

German Published Patent Application No. 101 38 764 describes an apparatus for triggering a restraint device featuring crash sensors inside and outside of the control unit. These crash sensors also generate, in addition to the crash signal, a plausibility signal for checking the crash signal.

SUMMARY

By contrast, an apparatus according to an example embodiment of the present invention for triggering restraint devices may provide that vehicle sensors external to the system generate the plausibility signal. These are vehicle sensors located outside of the restraint system, that is, they are neither located within the control unit, nor are they crash sensors located outside of the control unit. This may lead to speed advantages, and may also lead to the complete elimination of the plausibility sensor.

Illustratingly, in the case of a side crash for instance, the plausibility may be assumed as given based on the information "vehicle is skidding" from a vehicle dynamics control system (ESP=electronic stability program). This may eliminate the waiting time prior to the acceleration reaching a central sensor in the control unit of the restraint system. This may represent a significant speed advantage and hence a faster triggering of restraint devices.

The apparatus may receive the plausibility signal from a knock control system. The engine control unit continuously analyzes the structure-borne sound signal at the engine block to detect engine knock and prevent it through control interventions. This signal may be checked for crash signatures for the purpose of deriving a plausibilization of conventional triggering decision from it. This may eliminate the installation of an additional plausibility sensor.

If conventional plausibility sensors are used in addition, an overall plausibility signal may be generated through an OR operation on the plausibility signal of the crash sensor and of the vehicle sensor, which may be drawn upon in the triggering decision.

Exemplary embodiments of the present invention are shown in the Figures and are explained in more detail in the following description.

DETAILED DESCRIPTION

Airbags have been part of the safety equipment of motor vehicles for years. For triggering the pyrotechnic system, an algorithm is processed in the software of the electrical control unit. The input variables for this algorithm may be sensor signals for detecting crash severity, for example, acceleration signals and pressure signals, as well as information regarding occupancy, the closing of seatbelt buckles, etc.

To guard against false triggerings due to defective sensors, a principle to be followed is that the triggering decision must be plausibilized. This may be done via an independent sensor.

Two problems may be encountered in the plausibility concepts that may currently be in use:

1. Additional Costs

If, for example, an additional X sensor is used for plausibilizing the acceleration signal in the X direction, i.e., in the direction of travel, costs may be incurred which may only support the safety concept, but which may provide no additional noticeable benefit to the customer.

2. Performance

If, for example, a peripheral sensor is used in the crash zone for detecting a side crash, this may allow for a rapid triggering decision, but subsequently the system may still have to wait for the plausibility of the safety sensor in the central unit. This is due to the fact that accelerations are measurable there only a few milliseconds afterwards.

An example embodiment of the present invention may exploit information quasi external to the system for plausibilizing the crash, instead of using a sensor of the restraint system for plausibilization. This may either lead to speed advantages or possibly even to the complete elimination of the plausibility sensor.

An example of such information external to the system is the signal of the ESP. Based on the information "vehicle skidding", the plausibility may be deduced as given in a side crash, for example. This may eliminate the waiting time prior to the acceleration reaching the central sensor.

Another alternative is the structure-borne sound signal of the knock control system. This structure-borne sound signal, which is continuously recorded, may be checked for crash signatures to identify a crash or crash-related signals using pattern recognition. These may serve as plausibility signal.

Figure 1:
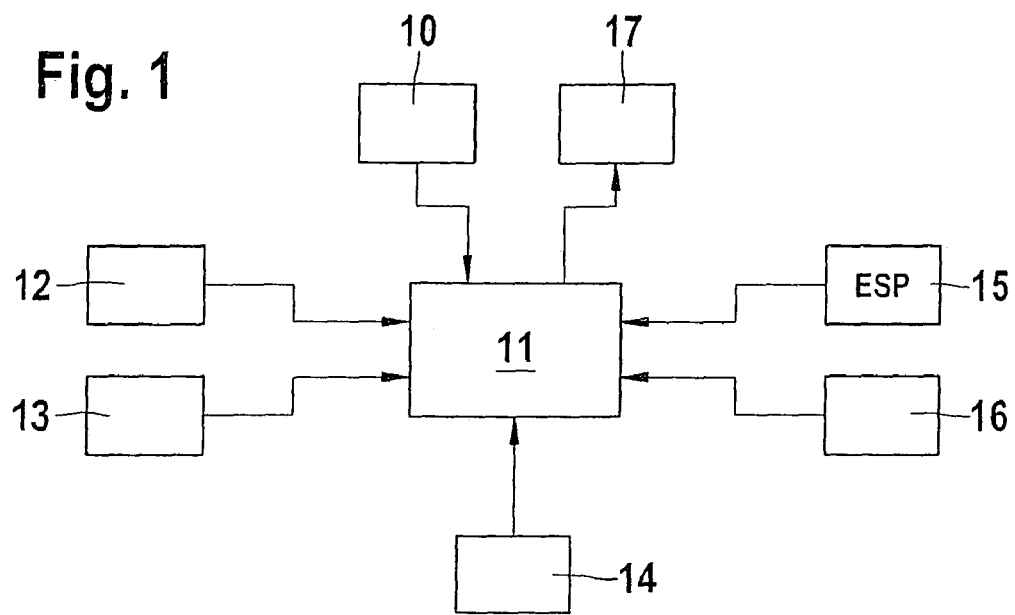
FIG. 1 is a block diagram of an apparatus according to an example embodiment of the present invention.

FIG. 1 illustrates an apparatus according to an example embodiment of the present invention in a block diagram. A control unit 11, which may be mounted at the tunnel of the vehicle, is connected to a side-impact sensor 10 via a first data input. Via a second data input, control unit 11 is connected to a side-impact sensor 14 on the opposite side. In this context, side-impact sensors 10 and 14 may be acceleration sensors. Alternatively, they may be pressure sensors that detect an adiabatic pressure increase in a hollow body in the side panels of the vehicle resulting from the deformation of this hollow body in the course of a side impact. Other deformation sensors may be used as well for this purpose. Upfront sensors 12 and 13 attached to the radiator are connected to control unit 11 via a third and a fourth data input. These are acceleration sensors that measure the acceleration at least in the direction of travel. It is possible that they are also capable of measuring accelerations transverse to the direction of travel, in the Y direction, and in the vertical direction. Via a fifth data input, control unit 11 is connected to an ESP control unit 15, and via a sixth data input, control unit 11 is connected to a knock control system 16.

Control unit 11 itself features a processor memory and its own sensors to process a triggering algorithm for restraint devices 17 from the crash signals of sensors 10, 12, 13 and 14. Restraint devices 17, to which control unit 11 is connected via a data output, are airbags, seatbelt tensioners, a rollover bar, etc. Sensors 10, 12, 13 and 14 are installed remotely so as to be closer to the crash location. This may allow for faster registration of crash signals. The algorithm running in the processor of control unit 11, however, may also require plausibility signals for detecting failures or errors of crash sensors 10, 12, 13 and 14. For this purpose, control unit 11 may either use signals of the crash sensors themselves, for example, the mutual plausibility of side-impact sensors 10 and 14, or also from sensors within control unit 11 itself, that is, from central sensors. Signals of ESP control unit 15 for controlling the vehicle dynamics and of knock control system 16 may also be used for plausibility. ESP control unit 15 indicates the state of the vehicle dynamics and thus makes it possible to infer a possible crash. Knock control system 16 continuously monitors a structure-borne sound signal at the engine block, and this structure-borne sound signal may also contain crash signatures allowing for the identification of such a crash. If both or one of these are used, then possibly a plausibility via crash sensors may even be eliminated.

Figure 2:
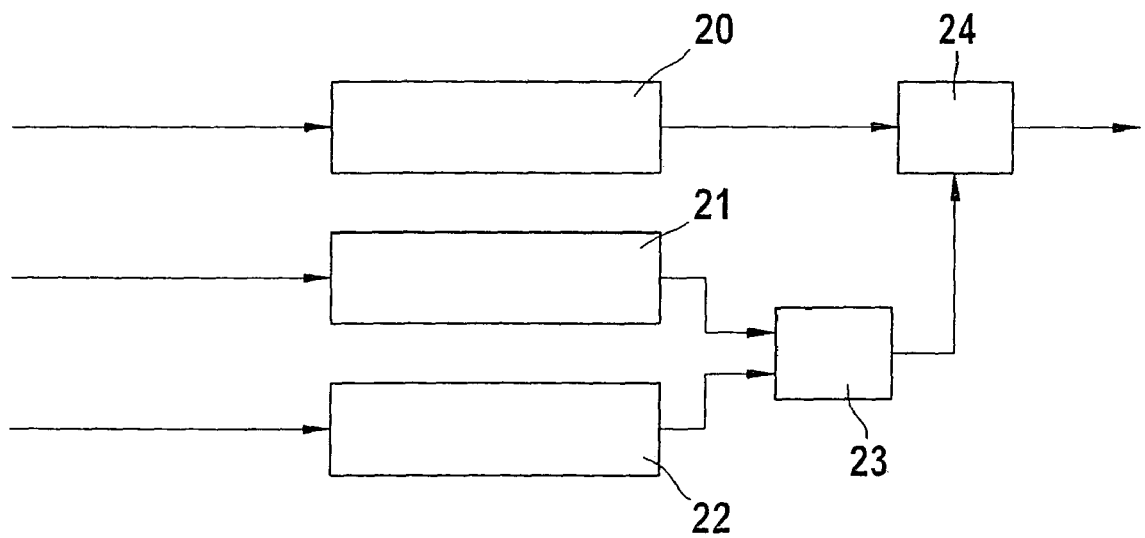
FIG. 2 is a flowchart of a process running in an apparatus according to an example embodiment of the present invention.

FIG. 2 illustrates a flowchart of the process running in an apparatus according to an example embodiment of the present invention. The algorithm for generating the triggering decision is executed in block 20. To this end, control unit 11 receives triggering-relevant sensor signals from sensors 10, 12, 13 and 14. At the same time, a plausibility check is performed in blocks 21 and 22. This plausibility check may be performed in block 21 on a conventional plausibility signal, i.e., on a signal of one of crash sensors 10, 12, 13 or 14 or of a central sensor in control unit 11. There, a mechanical switch, for example a Hamlin switch, may be used as well. In addition, a plausibility check is performed in block 22 on the basis of the signals of ESP control unit 15 or of knock control system 16. The plausibility checks of blocks 21 and 22 are combined in an OR operation in block 23. That is to say, if only one of blocks 21 or 22 indicates a plausibility signal, then the output of OR gate 23 will yield a logical one, indicating the presence of a plausibility signal for a crash. OR gate 23 is connected to a first input of an AND gate 24. Block 20, which outputs the triggering decision, is connected to a second input. If the triggering decision is YES and a plausibility signal was detected, then the instruction to fire is given at the output of AND gate 24. If no triggering decision was generated or if no plausibility signal is present, then no firing instruction is issued.

Alternatively, it is possible to use only lower block 22, in which case OR gate 23 may be eliminated. In that case, only the triggering decision of block 20 and the plausibility check of block 22 are combined in an AND operation. If both are present, an instruction to fire is issued. If only one is missing, no instruction to fire is issued.

What is claimed is:

1. An apparatus for triggering a restraint device, comprising:

a control unit directly connected to a plurality of crash sensors; and
at least one vehicle sensor located outside of the control unit, as a component within a control system that is connected to the control unit and controls a vehicle function other than triggering of the restraint device;
wherein the control unit is configured to check a crash signal generated by a first one of the plurality of crash sensors against a plausibility signal generated in response to an earliest-occurring one of (i) a crash signal from another one of the plurality of crash sensors, and (ii) a crash signal from the control system, the control unit triggering the restraint device when both the crash signal generated by the first one of the plurality of crash sensors and the plausibility signal are present.

2. The apparatus of claim 1, wherein the control system is a vehicle dynamics control system.

3. The apparatus of claim 2, wherein the first one of the plurality of crash sensors is a side-impact sensor, and the crash signal from the vehicle dynamics control system is generated in response to a signal from the at least one vehicle sensor.

4. The apparatus of claim 1, wherein the control system is a knock control system.

5. The apparatus of claim 4, wherein the knock control system is configured to analyze a structure-borne sound signal for a presence of a crash signature and to generate, independent of the plurality of crash sensors, the crash signal as a function of the crash signature.

6. An apparatus for triggering a restraint device, comprising:

control means directly connected to a plurality of crash sensing means; and
at least one vehicle sensing means located outside of the control means, as a component within an additional control means that is connected to the control means and controls a vehicle function other than triggering of the restraint device;
wherein the control means is for checking a crash signal generated by a first one of the plurality of crash sensing means against a plausibility signal generated in response to an earliest-occurring one of (i) a crash signal from another one of the plurality of crash sensing means, and (ii) a crash signal from the additional control means, the control means triggering the restraint device when both the crash signal generated by the first one of the plurality of crash sensing means and the plausibility signal are present.

* * * * *